United States Patent
Hashim et al.

(10) Patent No.: US 9,800,069 B2
(45) Date of Patent: Oct. 24, 2017

(54) LINEAR CURRENT REGULATOR FOR HIGH VOLTAGE BUS PRECHARGING

(71) Applicant: Ford Global Technologies, LLC, Dearborn, MI (US)

(72) Inventors: Hasdi R Hashim, Ann Arbor, MI (US); Arnold Kweku Mensah-Brown, Canton, MI (US); Bruce Carvell Blakemore, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 812 days.

(21) Appl. No.: 14/244,889

(22) Filed: Apr. 3, 2014

(65) Prior Publication Data
US 2015/0288211 A1 Oct. 8, 2015

(51) Int. Cl.
*H02J 1/06* (2006.01)
*H02J 7/00* (2006.01)
*B60L 11/18* (2006.01)

(52) U.S. Cl.
CPC ......... *H02J 7/0063* (2013.01); *B60L 11/1851* (2013.01); *H02J 1/06* (2013.01); *B60L 2240/527* (2013.01); *B60L 2240/547* (2013.01); *Y02T 10/7005* (2013.01); *Y10T 307/76* (2015.04)

(58) Field of Classification Search
CPC ............ H02J 7/06; H02J 7/0063; B60L 11/00
See application file for complete search history.

(56) References Cited

U.S. PATENT DOCUMENTS

| 8,129,951 | B2 | 3/2012 | Turner et al. |
| 8,203,810 | B2 | 6/2012 | Bryan et al. |
| 2013/0121051 | A1* | 5/2013 | Weiss ...................... H02H 7/09 363/131 |
| 2015/0256014 | A1* | 9/2015 | Tzivanopoulos ... B60L 11/1803 320/107 |

FOREIGN PATENT DOCUMENTS

JP         2005253206 A    9/2005

* cited by examiner

*Primary Examiner* — Jeffrey Shin
(74) *Attorney, Agent, or Firm* — James P. Muraff; Neal, Gerber & Eisenberg LLP

(57) ABSTRACT

A linear current regulator is provided for precharging a high voltage bus, such as within a hybrid electric vehicle, in a quick, efficient, and optimal manner. The linear current regulator can include a battery; a bus; a transistor having, a base, a collector coupled to the bus, and an emitter; a resistor coupled between a precharge switch and the base; the precharge switch coupled to the battery and the resistor; and a main contactor coupled to the battery, the emitter, and the bus. When the recharge switch is closed, the bus is connected to the battery through the resistor and the transistor so that the bus is charged. When the voltages of the bus and the battery are nearly equal, the transistor turns off, the precharge switch is opened, and the main contactor is closed for normal operation of the vehicle.

18 Claims, 4 Drawing Sheets

US 9,800,069 B2

LINEAR CURRENT REGULATOR FOR HIGH VOLTAGE BUS PRECHARGING

TECHNICAL FIELD

This application generally relates to precharging a high voltage bus, and in particular, to using a linear current regulator to precharge a high voltage bus from a high voltage battery, such as in a hybrid electric vehicle.

BACKGROUND

Hybrid electric vehicles use an internal combustion engine and electric motors for propulsion. The electric motors can be powered by a battery that is usually at a high voltage, such as 200-300 volts. The battery and the electric motors can be electrically connected to each other by a high voltage bus that carries current from the battery to the electric motor and/or to other components of the vehicle. The high voltage bus and the battery can be connected through a main contactor during normal operation of the vehicle.

Prior to normal operation of the vehicle, the high voltage bus may be at a voltage less than the voltage of the battery. When normal operation of the vehicle is desired, the high voltage bus is typically precharged by connecting the high voltage bus to the battery through a precharge contactor and a resistor, so that the voltage of the high voltage bus is brought up to the voltage of the battery within a certain tolerance, such as 10 V. After the high voltage bus is precharged, a main contactor can be closed to directly connect the battery to the high voltage bus. However, while this type of precharging brings the voltage of the high voltage bus close to the voltage of the battery, the high voltage bus may not be precharged in the quickest, most efficient, and optimal way.

Accordingly, there is an opportunity for systems and methods for precharging a high voltage bus with a uniform current through the use of relatively inexpensive components while allowing the high voltage bus to be fully charged in a quick, efficient, and optimal way.

SUMMARY

In one embodiment, a circuit is provided for precharging a bus. The circuit includes a battery; a resistor; a transistor coupled to the resistor, the bus, and a main contactor; a precharge switch coupled between the battery and the resistor for selectively connecting the bus to the battery through the resistor and the transistor; and the main contactor for selectively connecting the bus directly to the battery.

In another embodiment, a method is provided for precharging a bus with a circuit comprising a precharge switch coupled between a battery and a resistor, a transistor coupled to the resistor, the bus, and a main contactor. The method includes closing the precharge switch to connect the bus to the battery though the resistor and the transistor; and when a voltage of the bus is approximately a voltage of the battery, opening the precharge switch and closing the main contactor to connect the bus directly to the battery.

These and other embodiments, and various permutations and aspects, will become apparent and be more fully understood from the following detailed description and accompanying drawings, which set forth illustrative embodiments that are indicative of the various ways in which the principles of the invention may be employed.

DETAILED DESCRIPTION

The description that follows describes, illustrates and exemplifies one or more particular embodiments of the invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the invention is intended to cover all such embodiments that may fall within the scope of the appended claims, either literally or under the doctrine of equivalents.

Figure 1:
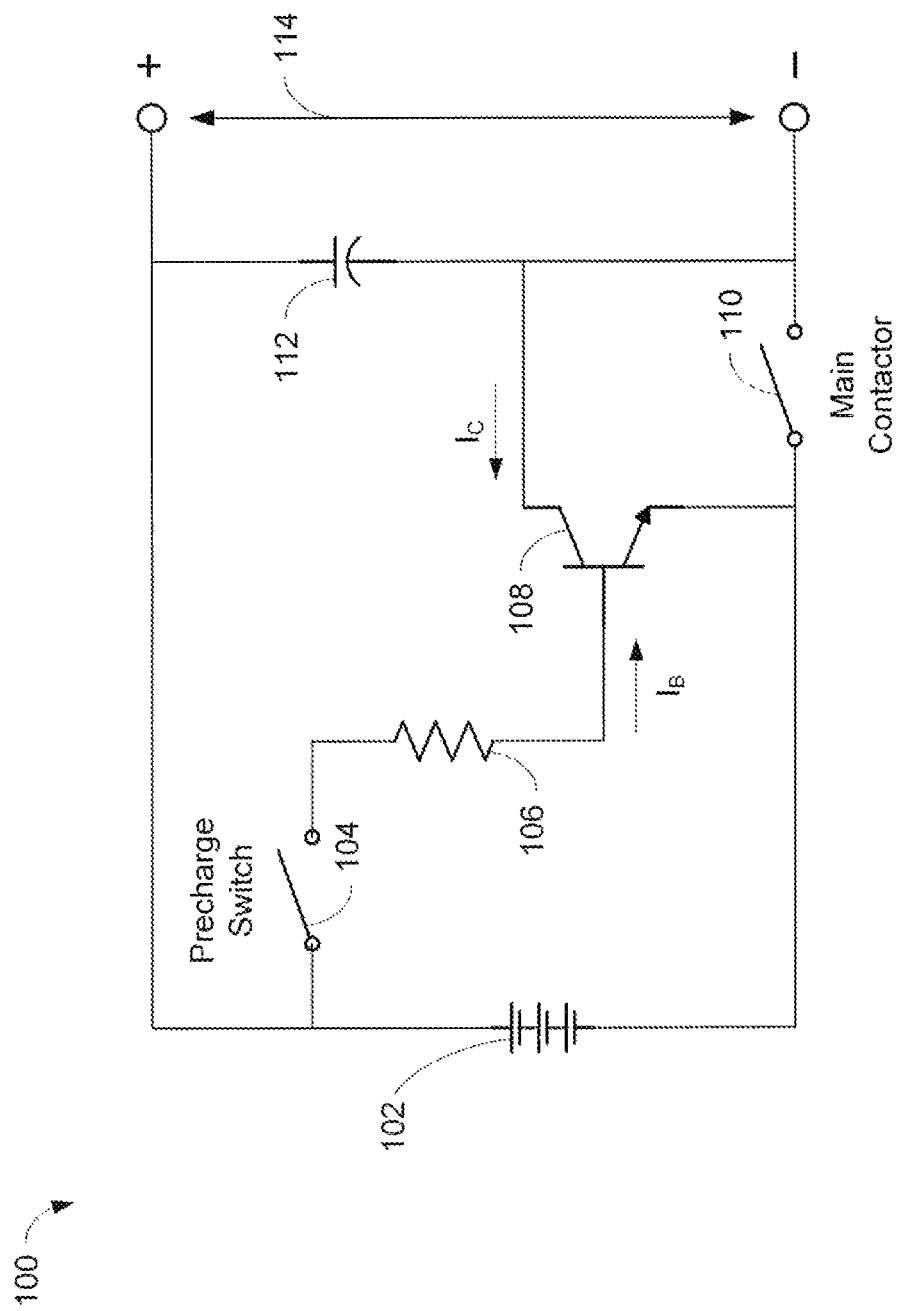
FIG. 1 is a schematic of at embodiment of a linear current regulator precharge circuit for precharging a high voltage bus.

FIG. 1 illustrates a schematic of an embodiment of a linear current regulator precharge circuit 100 for a high voltage bus 114. The high voltage bus 114 may be connected to a high voltage battery 102 in a hybrid electric vehicle, for example, so that the high voltage bus 114 can power one or more electric motors (not shown) for propulsion of the vehicle. The high voltage bus 114 can also power other components of the vehicle that utilize the high voltage. The battery 102 may be 200 V, 300 V, or another appropriate voltage. A capacitor 112 of the high voltage bus 114 is shown in FIG. 1 that represents the lumped capacitance of the various loads on the high voltage bus 114, e.g., the electric motors and other components. The capacitor 112 may have a capacitance of 1600 µF, for example, or another appropriate capacitance.

The circuit 100 can quickly, efficiently, and optimally precharge the high voltage bus 114 from the battery 102, and cart include a precharge switch 104, resistor 106, NPN transistor 108, and main contactor 110. The high voltage bus 114 can be precharged to nearly the voltage of the battery 102 so that the battery 102 can later be directly connected to the high voltage bus 114 through the main contactor 110 for normal operation of the vehicle. In particular, the high voltage bus 114 can be precharged with a uniform current, using the circuit 100, to approximately the voltage of the battery 102 minus the base-emitter voltage $V_{BE}$ of the transistor 108. Accordingly, if the voltage of the battery 102 is 300 V, then the high voltage bus 114 can be precharged to nearly 300 V, in contrast to previous precharging strategies, which may precharge a high voltage bus with a non-uniform current to only within a tolerance, e.g., 10 V, of the voltage of a battery. Components, such as the precharge switch 104 and main contactor 110, can therefore be utilized in the circuit 100 that are relatively inexpensive and that take up less weight and space by precharging the high voltage bus 114 to nearly the voltage of the battery 102 with a uniform current.

The precharge switch 104 can be coupled between a terminal, e.g., the positive terminal, of the battery 102, and the resistor 106, to selectively connect the battery 102 to the high voltage bus 114 through the resistor 106 and the transistor 108. The precharge switch 104 may be an opto-isolator or another type of switch. A control module (not shown) in the vehicle may be in communication with the precharge switch 104 to send commands to close and open the precharge switch 104. The control module may be, for example, a high voltage battery control module that can also control other battery-related functionality, such as thermal management, leakage detection, and other battery control functions. The control module and the precharge switch 104 may be electrically supplied by another bus that is at a different voltage, e.g., a low voltage bus at 12 V, than the high voltage bus 114. If an opto-isolator or similar switch is used as the precharge switch 104, the control module and the precharge switch 104 may be electrically isolated from the high voltage bus 114 for safety reasons. The precharge switch 104 may be closed and opened to connect and disconnect the battery 102 to the high voltage bus 114, respectively, through the resistor 106 and the transistor 108, as described below.

The resistor 106 can be coupled between the precharge switch 104 and the base of the transistor 108. When the precharge switch 104 is closed to activate the transistor 108, the resistance of the resistor 106 determines the base current $I_B$ into the base of the transistor 108. The resistance of the resistor 106 may be 2500Ω (2.5 kΩ), for example, or may be another appropriate resistance. In particular, if the voltage of the battery 102 is 300 V and the resistance of the resistor 106 is 2500Ω, then the base current $I_B$ is 120 mA when the transistor 108 is active.

The NPN transistor 108 can be a bipolar junction transistor that has a base connected to the resistor 106, a collector connected to the capacitor 112 and the high voltage bus 114, and an emitter connected to the main contactor 110 and a terminal, e.g., the negative terminal, of the battery 102. When the high voltage bus 114 is to be precharged, the transistor 108 can be activated by closing the precharge switch 104, so that the battery 102 is connected to the high voltage bus 114 through the precharge switch 104, the resistor 106, and the transistor 108. The current gain β of the transistor 108 determines the collector current $I_C$ into the collector of the transistor 108 as a function of the base current $I_B$, when the transistor 108 is active. In particular, when the transistor 108 is active, the collector current $I_C$ is approximately equal to the current gain β of the transistor 108 multiplied by the base current $I_B$ ($I_C=\beta I_B$). The current gain β of the transistor 108 may be 40, for example, or may be another appropriate value.

The main contactor 110 may be coupled to a terminal, e.g., the negative terminal, of the battery 102, the emitter of the transistor 108, and the high voltage bus 114, to selectively connect the battery 102 directly to the high voltage, bus 114. In particular, the main contactor 110 may be open when the vehicle is turned off and not in normal operation so that the battery 102 is not directly connected to the high voltage bus 114. In this case, the high voltage bus 114 is being precharged (i.e., the precharge switch 104 is closed and the transistor 108 is active). The main contactor 110 may be closed when the vehicle is turned on and in normal operation so that the battery 102 is directly connected to the high voltage bus 114. In this case, the high voltage bus 114 has been charged (i.e., the precharge switch 104 is open and the transistor 108 is turned off). The main contactor 110 may be a relay, for example. A command module may transmit commands to the main contactor 110 to open and close.

Figure 2:
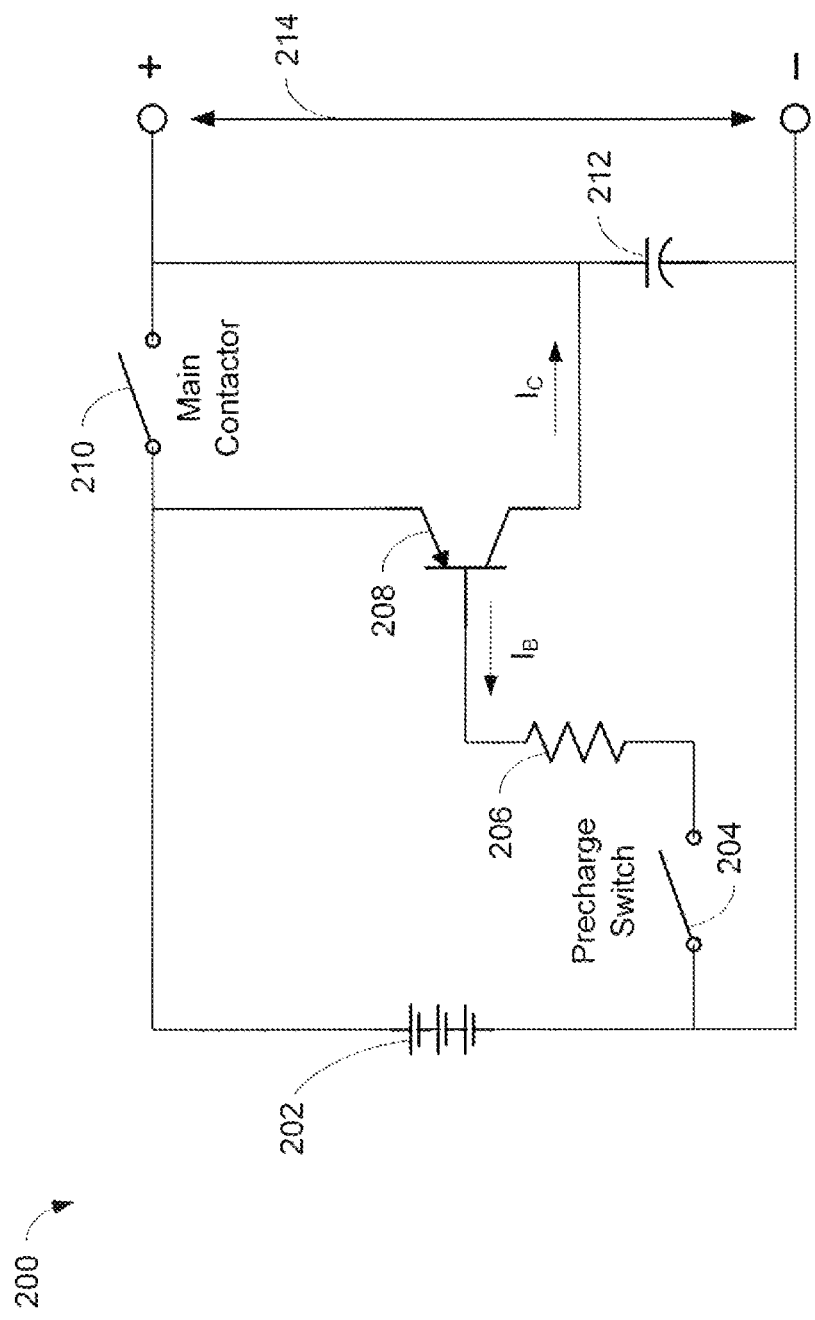
FIG. 2 is a schematic of another embodiment of a linear current regulator precharge circuit for precharging a high voltage bus.

FIG. 2 illustrates a schematic of another embodiment of a linear current regulator precharge circuit 200 for a high voltage bus 214. The precharge circuit 200 is similar to the circuit 100 of FIG. 1, described above, for connecting a high voltage battery 202 to the high voltage bus 214, but instead includes a PNP transistor 208. The other components of the circuit 200, including the battery 202, the precharge switch 204, the resistor 206, the main contactor 210, and the capacitor 212 may function similarly as their counterpart components described above in the circuit 100.

The circuit 200 may also quickly, efficiently, and optimally precharge the high voltage bus 214 to nearly the voltage of the battery 202 so that the battery 202 can later be directly connected to the high voltage bus 214 through the main contactor 210 for normal operation of the vehicle. In particular, the high voltage bus 214 can be precharged with a uniform current, using the circuit 200, to approximately the voltage of the battery 202 minus the base-emitter voltage $V_{BE}$ of the transistor 208. The precharge switch 204 can selectively connect the battery 202 to the high voltage bus 214 through the resistor 206 and the transistor 208.

The PNP transistor 208 can be a bipolar junction transistor that has a base connected to the resistor 206, a collector connected to the capacitor 212 and the high voltage bus 214, and an emitter connected to the main contactor 210 and a terminal, e.g., the positive terminal, of the battery 202. When the high voltage bus 214 is to be precharged, the transistor 208 can be activated by closing the precharge switch 204, so that the battery 202 is connected to the high voltage bus 214 through the precharge switch 204, the resistor 206, and the transistor 208. The current gain β of the transistor 208 determines the collector current $I_C$ out of the collector of the transistor 208 as a function of the base current $I_B$, when the transistor 208 is active. In particular, when the transistor 208 is active, the collector current $I_C$ is approximately equal to the current gain β of the transistor 208 multiplied by the base current $I_B$ ($I_C=\beta*I_B$). The current gain β of the transistor 208 may be 40, for example, or may be another appropriate value. The base current $I_B$ out of the transistor 208 may be 120 mA when the transistor 208 is active, if the voltage of the battery 202 is 300 V and the resistance of the resistor 206 is 2500Ω, for example.

In operation, the circuit 100, 200 can precharge the high voltage bus 114, 214 when the voltage of the high voltage bus 114, 214 is less than the voltage of the battery 102, 202. For example, the voltage of the high voltage bus 114, 214 may be at 0 V at an initial time instance t=0, such as when the vehicle is turned off and not in normal operation. Precharging the high voltage bus 114, 214 is intended to raise the voltage of the high voltage bus 114, 214 to nearly the voltage of the battery 102, 202 so that the main contactor 110, 210 can later be closed for commencing normal operation of the vehicle.

The time to precharge the high voltage bus 114, 214 may vary depending on the particular specifications and requirements for the vehicle and the systems in the vehicle. For example, it may be specified that the high voltage bus 114, 214 should be precharged to 300 V within 100 ms. When the vehicle is turned on to begin normal operation, the precharge switch 104, 204 may be closed so that the battery 102, 202 is connected to the high voltage bus 114, 214 through the resistor 106, 206 and transistor 108, 208, such as at step 302 of the process 300 shown in FIG. 3. As described above, a control module may transmit a command to the precharge switch 104, 204 to close, for example.

When the battery 102, 202 is connected to the high voltage bus 114, 214 through the resistor 106, 206 and transistor 108, 208, the base current $I_B$ at the base of the transistor 108, 208 controls the collector current $I_C$ at the collector of the transistor 108, 208. Specifically, the collector current $I_C$ of the transistor 108, 208 is limited by the base current $I_B$ of the transistor 108, 208. For example, if the base current $I_B$ is 120 mA (as described above when the resistance of the resistor 106, 206 is 2500Ω and the voltage of the battery 102, 202 is 300 V), and the current gain β of the transistor 108, 208 is 40, then the collector current $I_C$ is 4.8 A when the transistor 108, 208 is active. The collector current $I_C$ needs to be 4.8 A in order for the voltage of the high voltage bus 114, 214 to reach 300 V in 100 ms with the capacitor 112, 212 being 1600 μF, in this example (I=(C*V)/t, or (1600 μF*300 V)/100 ms=4.8 A). In this case, the power through the transistor 108, 208 is instantaneously 1440 W at time t=0. The precharge switch 104, 204 can therefore be relatively inexpensive and take up loss weight and space because the peak current through the precharge switch 104, 204 is relatively low. In addition, the other components in the circuit 100, 200, e.g., the resistor 106, 206, transistor 108, 208, and main contactor 110, 210, may also be relatively inexpensive and take up less weight and space.

Figure 4:
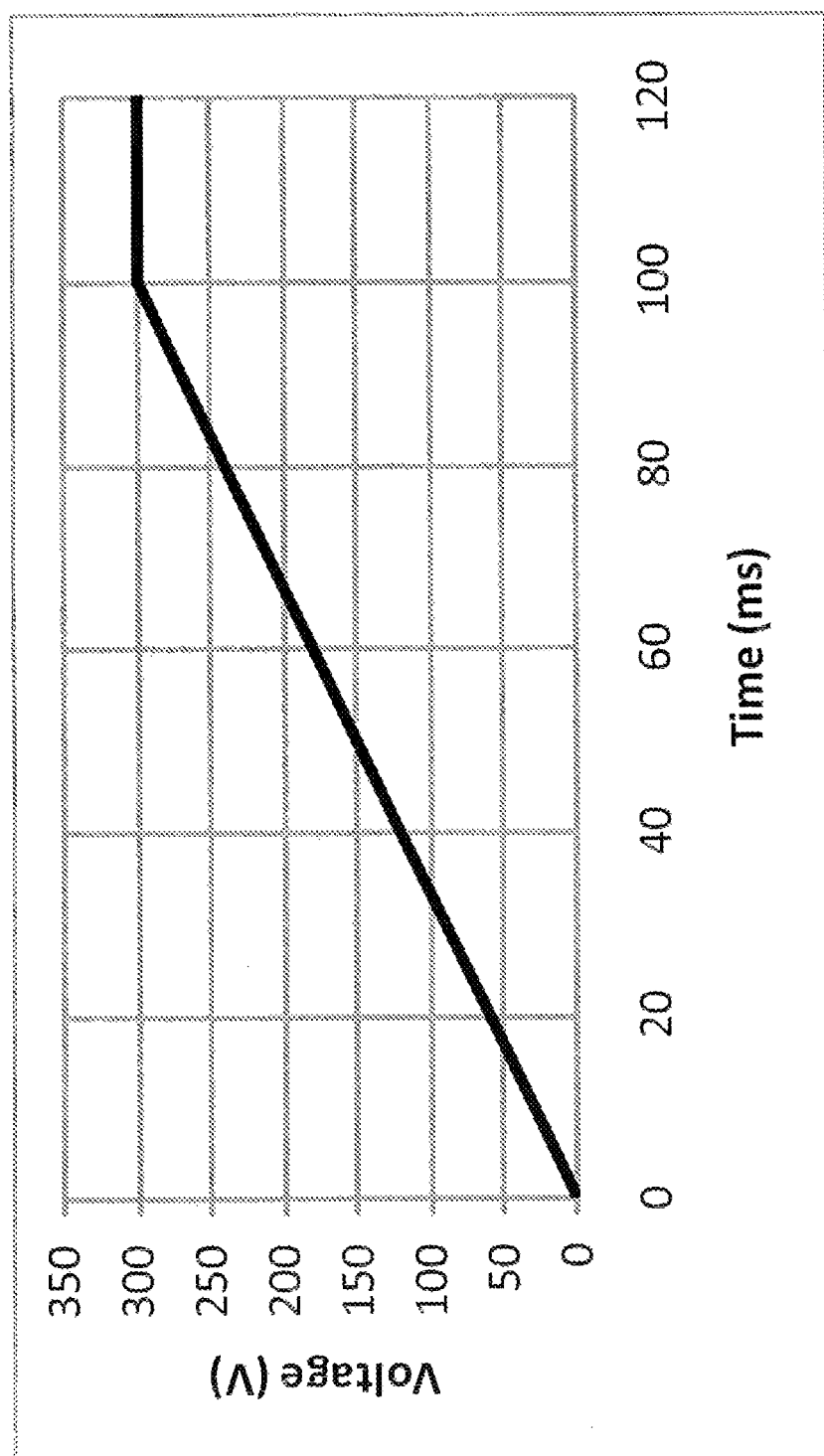
FIG. 4 is an exemplary graph of voltage of the high voltage bus versus time using the linear current regulator precharge circuit.

The collector current $I_C$, e.g. 4.8 A, may be uniform and can charge the capacitor 112, 212 and the high voltage bus 114, 214 in a constant and linear manner so that voltage and timing requirements are met. FIG. 4 shows a graph of the voltage of the high voltage bus 114, 214 versus time when the circuit 100, 200 and the process 300 are utilized. In particular, the voltage of the high voltage bus 114, 214 rises linearly over time when the precharge switch 104, 204 has been closed and the transistor 108, 208 is active, until the voltage of the high voltage bus 114, 214 and the battery 102, 202 are nearly equal. In the example shown in FIG. 4, the voltage of the high voltage bus 114, 214 linearly rises from 0 V at time t=0 to nearly 300 V at time t=100 ms. At time t=100 ms, the power through the transistor 108, 208 drops to 0 W from 1440 W at time t=0.

Figure 3:
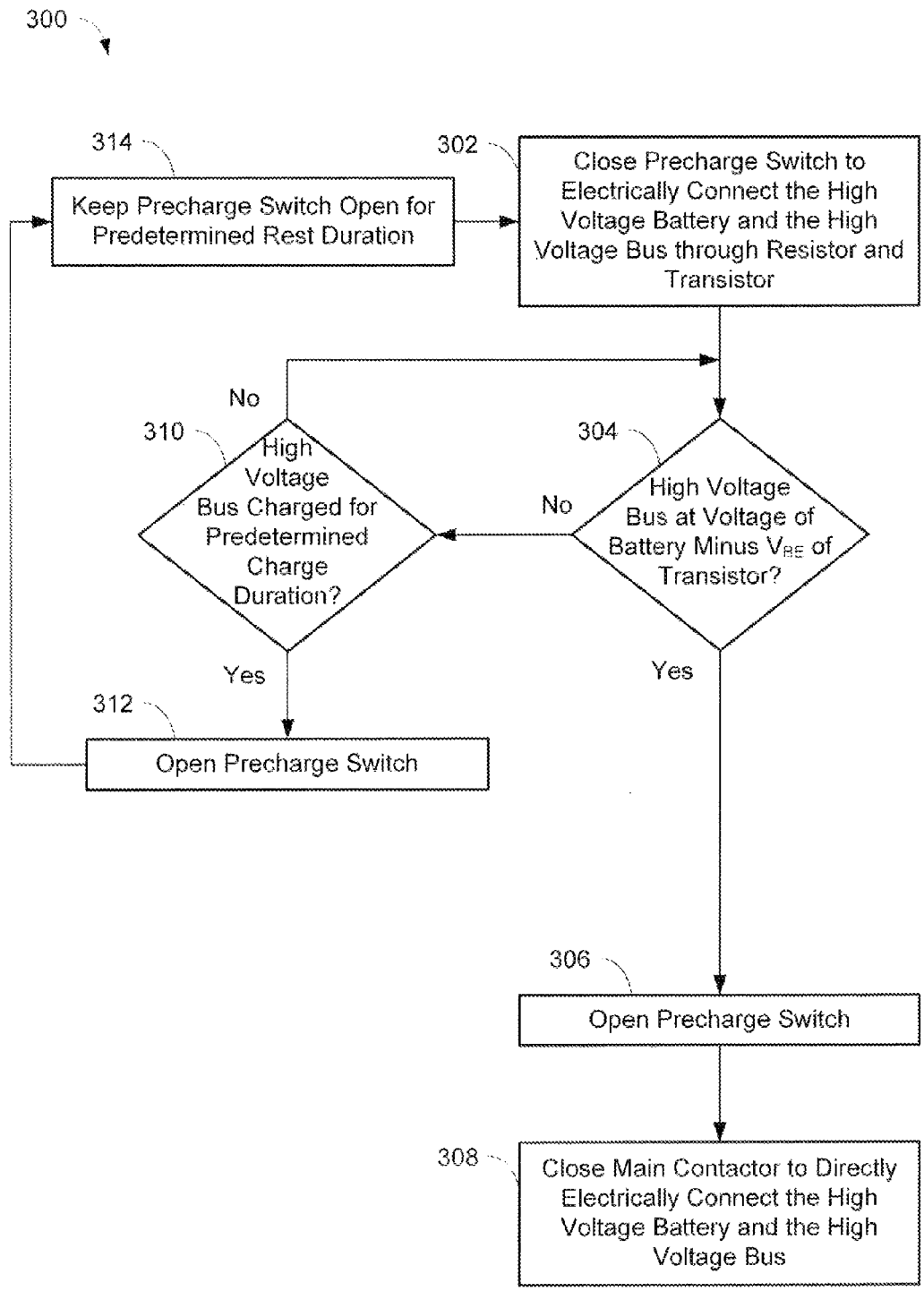
FIG. 3 is a flowchart illustrating operations for precharging a high voltage bus using a precharge switch, a resistor, a transistor, and a main contactor.

The voltage of the high voltage bus 114, 214 can be monitored, such as at step 304 of the process 300 shown in FIG. 3, to determine whether the voltage of the high voltage bus 114, 214 is at the voltage of the battery 102, 202 minus the base-emitter voltage $V_{BE}$ of the transistor 108, 208. A control module, such as a high voltage battery control module as described above, for example, may monitor the voltage of the high voltage bus 114, 214. The voltage of the high voltage bus 114, 214 will not necessarily be exactly equal to the voltage of the battery 102, 202 after precharging is complete with the circuit 100, 200 because the transistor 108, 208 turns off once the voltage of the high voltage bus 114, 214 is within the threshold voltage of the transistor 108, 208, e.g., the base-emitter voltage $V_{BE}$. The threshold voltage of the transistor 108, 208 may be 1-2 V, for example.

At step 304, if the voltage of the high voltage bus 114, 214 is at the voltage of the battery 102, 202 minus the base-emitter voltage $V_{BE}$ of the transistor 108, 208, then the process 300 can continue to step 306. When the transistor 108, 208 turns off at this point, then the battery 102, 202 is no longer connected to the high voltage bus 114, 214 through the resistor 106, 206 and the transistor 108, 208. The precharge switch 104, 204 can then be opened at step 306. A command module may transmit a command to the precharge switch 104, 204 to open, for example, at step 306.

Because the voltage of the high voltage bus 114, 214 is nearly at the voltage of the battery 102, 202, e.g., 300 V, at step 306, the main contactor 110, 210 can be closed, such as at step 308 of the process 300, to directly connect the battery 102, 202 and the high voltage bus 114, 214. The voltage of the high voltage bus 114, 214 at this point is the voltage of the battery 102, 202 minus the base-emitter voltage $V_{BE}$ of the transistor 108, 208. Accordingly, the precharged high voltage bus 114, 214 is much closer to the voltage of the battery 102, 202 when the main contactor 110, 210 is closed, as compared to previous precharging strategies. The vehicle can be in normal operation after the main contactor 110, 210 is closed at step 308 so that the battery 102, 202 directly powers the electric motors and other components on the high voltage bus 114, 214.

However, referring back to step 304, if the voltage of the high voltage bus 114, 214 is not yet at the voltage of the battery 102, 202 minus the base-emitter voltage $V_{BE}$ of the transistor 108, 208, then the process 300 can continue to step 310. It may be determined at step 310 whether the high voltage bus 114, 214 has been precharged for a predetermined charge duration, e.g., 100 ms. A control nodule, such as a high voltage battery control module as described above, for example, may monitor and determine whether the predetermined charge duration has been reached. The predetermined charge duration may specify the maximum time limit for precharging the high voltage bus 114, 214 after the precharge switch 104, 204 was closed at the initial time instance. For example, the predetermined charge duration may be specified to protect the high voltage bus 114, 214 if the capacitance of the capacitor 112, 212 is larger than anticipated, and/or if there is a short circuit on the high voltage bus 114, 214. If the predetermined charge duration has not been reached at step 310, then the high voltage bus 114, 214 may continue to be precharged by the battery 102, 202 through the resistor 106, 206 and the transistor 108, 208. The process 300 may return to step 304, as described above, to continue monitoring the voltage of the high voltage bus 114, 214, and to determine whether the voltage of the high voltage bus 114, 214 is at the voltage of the battery 102, 202 minus the base-emitter voltage $V_{BE}$ of the transistor 108, 208.

However, if the predetermined charge duration has been reached at step 310, then the process 300 may continue to step 312. At step 312, the precharge switch 104, 204 may be opened. A command module may transmit a command to the precharge switch 104, 204 to open, for example, at step 312. When the precharge switch 104, 204 is opened at step 312, the battery 102, 202 is no longer connected to the high voltage bus 114, 214 through the resistor 106, 206 and the transistor 108, 208. The precharge switch 104, 204 may be kept open for a predetermined rest duration, e.g., one second, at step 314. The predetermined rest duration may allow the transistor 108, 208 to cool before precharging continues. A control module, such as a high voltage battery control module as described above, for example, may monitor and determine whether the predetermined rest duration has been reached. Following the predetermined rest duration, the process 300 may return to step 302 to close the precharge switch 104, 204 to continue precharging the high voltage bus 114, 214, from the battery 102, 202 through the resistor 106, 206 and the transistor 108, 208, as described previously.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

The invention claimed is:

1. A circuit for precharging a bus, comprising:
a battery;
a resistor coupled between a precharge switch and a transistor base coupled to the bus; and,
a transistor emitter coupled to
a main contactor, for selectively connecting the bus directly to the battery;
wherein the precharge switch is coupled between the battery and the resistor for selectively connecting the bus to the battery through the resistor and a transistor having the base and the emitter.

2. The circuit of claim 1, wherein:
a voltage of the bus is less than a voltage of the battery at an initial time instance; and
the main contactor is configured to open and the precharge switch is configured to be closed at the initial time instance to connect the bus to the battery through the resistor and the transistor such that the voltage of the bus linearly increases for up to a predetermined charge duration following the initial time instance.

3. The circuit of claim 2, wherein the precharge switch is configured to open for a predetermined rest duration after the predetermined charge duration to disconnect the bus from the battery through the resistor and the transistor, if the voltage of the bus is not approximately the voltage of the battery after the predetermined charge duration.

4. The circuit of claim 3, wherein the precharge switch is configured to close after the predetermined rest duration to connect the bus to the battery through the resistor and the transistor.

5. The circuit of claim 2, wherein the precharge switch is configured to open and the main contactor is configured to close to directly connect the bus to the battery, when the voltage of the bus is approximately the voltage of the battery after the predetermined charge duration.

6. The circuit of claim 2, wherein the precharge switch is configured to open and the main contactor is configured to close to directly connect the bus to the battery, when the voltage of the bus is approximately the voltage of the battery during the predetermined charge duration.

7. The circuit of claim 2, wherein the voltage of the bus increases linearly to approximately the voltage of the battery after the main contactor is configured to open and the precharge switch is configured to close.

8. The circuit of claim 2, wherein the voltage of the bus increases linearly to approximately the voltage of the battery minus a base-emitter voltage of the transistor after the main contactor is configured to open and the precharge switch is configured to close.

9. The circuit of claim 1, wherein the precharge switch selectively connects the bus to the battery through the resistor and the transistor based on a command from a control module, wherein the control module and the precharge switch are electrically supplied by a second bus that has a voltage lower than the voltage of the battery.

10. A method using a precharge switch coupled between a battery and a resistor, and a transistor coupled to the resistor, a bus, and a main contactor, comprising:
closing the precharge switch coupled to a first terminal of the battery and the resistor to connect the bus to the battery through the resistor and the transistor;
wherein the resistor is coupled between the precharge switch and a base of the transistor; a collector of the transistor is coupled to the bus, and an emitter of the transistor is coupled to a second terminal of the battery; and
when a voltage of the bus is approximately a voltage of the battery:
opening the precharge switch; and
closing the main contactor coupled to the second terminal, the emitter, and the bus to connect the bus directly to the battery.

11. The method of claim 10: further comprising opening the main contactor at an initial time instance; wherein:
the voltage of the bus is less than the voltage of the battery at the initial time instance; and
closing the precharge switch comprises closing the precharge switch at the initial time instance such that the voltage of the bus linearly increases for up to a predetermined charge duration following the initial time instance.

12. The method of claim 11, further comprising opening the precharge switch for a predetermined rest duration after the predetermined charge duration to disconnect the bus from the battery through the resistor and the transistor, if the voltage of the bus is not approximately the voltage of the battery after the predetermined charge duration.

13. The method of claim 12, further comprising closing the precharge switch after the predetermined rest duration to connect the bus to the battery through the resistor and the transistor.

14. The method of claim 11, further comprising opening the precharge switch and closing the main contactor to directly connect the bus to the battery, when the voltage of the bus is approximately the voltage of the battery after the predetermined charge duration.

15. The method of claim 11, further comprising opening the precharge switch and closing the main contactor to directly connect the bus to the battery, when the voltage of the bus is approximately the voltage of the battery during the predetermined charge duration.

16. The method of claim 10, wherein closing the precharge switch comprises closing the precharge switch such that the voltage of the bus linearly increases to approximately the voltage of the battery.

17. The method of claim of claim 10, wherein closing the precharge switch comprises closing the precharge switch such that the voltage of the bus increases linearly to approximately the voltage of the battery minus a base-emitter voltage of the transistor.

18. The method of claim 10, wherein:
closing the precharge switch comprises closing the precharge switch based on a first command from a control module;
opening the precharge switch comprises opening the precharge switch based on a second command from the control module; and the control module and the precharge switch are electrically supplied by a second bus that has a voltage lower than the voltage of the battery.

\* \* \* \* \*